United States Patent [19]

Scott et al.

[11] Patent Number: 4,939,194

[45] Date of Patent: Jul. 3, 1990

[54] CONTROLLABLY AND SWIFTLY DEGRADABLE POLYMER COMPOSITIONS AND FILMS AND OTHER PRODUCTS MADE THEREFROM

[75] Inventors: Gerald Scott, Lichfield, Great Britain; Dan Gilead, Kibbutz Hazorea, Israel

[73] Assignee: Plastopil Hazorea, Kibbutz Hazorea, Israel

[21] Appl. No.: 391,703

[22] Filed: Aug. 4, 1989

Related U.S. Application Data

[63] Continuation of Ser. No. 195,445, May 16, 1988, abandoned, which is a continuation of Ser. No. 120, Jan. 2, 1987, abandoned.

[30] Foreign Application Priority Data

Feb. 27, 1986 [GB] United Kingdom ............... 8604849

[51] Int. Cl.$^5$ .............................................. C08K 5/51
[52] U.S. Cl. ........................................ 524/134; 524/83; 524/122; 524/201; 524/368; 523/126
[58] Field of Search ............... 524/83, 122, 134, 201, 524/368; 523/126

[56] References Cited

U.S. PATENT DOCUMENTS

| 4,076,689 | 2/1978 | Mills .................................. 523/126 |
| 4,121,025 | 10/1978 | Scott ................................. 524/201 |
| 4,461,853 | 7/1984 | Gilead et al. ...................... 523/126 |
| 4,519,161 | 5/1985 | Gilead et al. ...................... 523/126 |

FOREIGN PATENT DOCUMENTS

| 965054 | 7/1964 | United Kingdom . |
| 1356107 | 6/1974 | United Kingdom . |
| 1400570 | 7/1975 | United Kingdom . |
| 1423655 | 2/1976 | United Kingdom . |
| 1586344 | 3/1981 | United Kingdom . |

OTHER PUBLICATIONS

Photo-Initialized Oxidation of Polyethylene Effect of Photo-Sensitizers, European Polymer Journal, vol. 10, pp. 1019-1028.

*Primary Examiner*—Joseph L. Schofer
*Assistant Examiner*—Peter D. Mulcahy
*Attorney, Agent, or Firm*—Merchant, Gould, Smith, Edell, Welter & Schmidt

[57] ABSTRACT

Polymer compositions comprising a vinyl polymer and a combination of at least two metal complexes wherein the complexing agent of the first complex is attached to the metal through oxygen and the metal is a transition metal, and the complexing agent of the second complex is attached to the metal through sulphur and the metal is a transition metal or a metal of group II or IV of the periodic table of the elements, wherein the molar ratio of the second metal complex to the first metal complex is 0.5 or less. A film obtained from such polymer compositions and its use agricultural processes are also claimed.

12 Claims, 1 Drawing Sheet

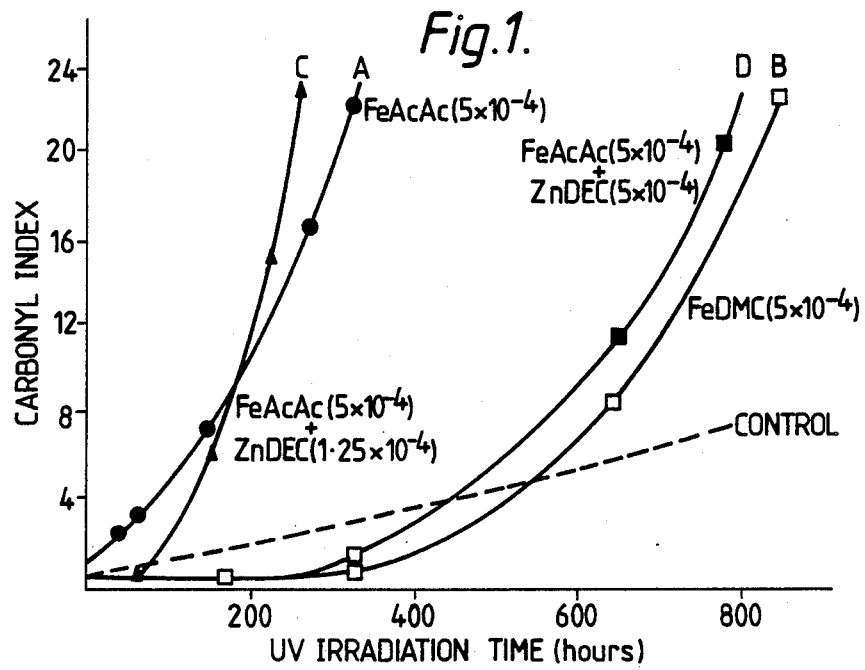
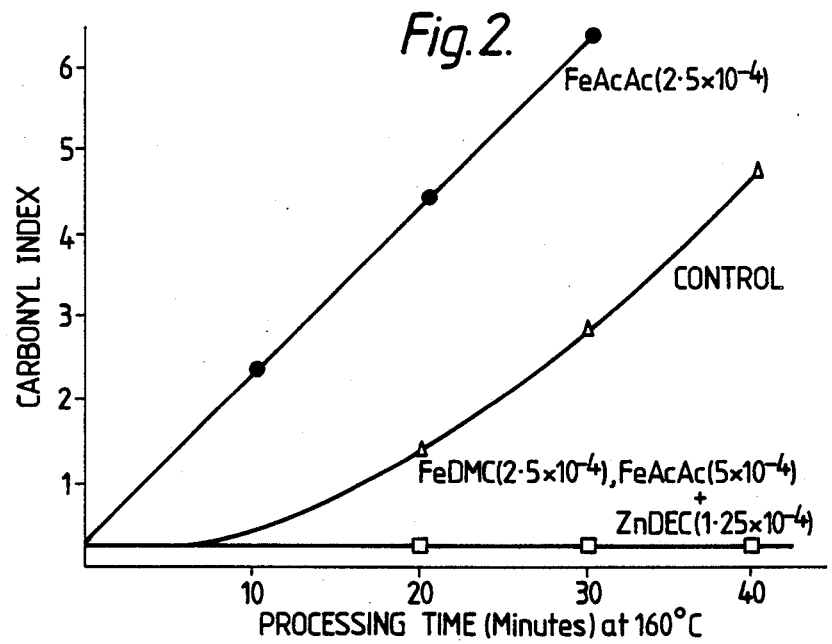

CONTROLLABLY AND SWIFTLY DEGRADABLE POLYMER COMPOSITIONS AND FILMS AND OTHER PRODUCTS MADE THEREFROM

This is a continuation of application Ser. No. 195,445, filed May 16, 1988, now abandoned which is a continuation of application Ser. No. 000,120 filed Jan. 2, 1987, now abandoned.

This invention relates to photogradable and thermally stable compositions based on homopolymers and copolymers of vinyl or vinylidene monomers such as polyethylene, polypropylene, polymethylpentene, polyvinlchloride, ethylene-propylene copolymers, condensation polymers, e.g. polyamides, polyesters, polyurethanes. etc., and intercopolymers containing unsaturation, as well as mixtures of such polymers, which degrade very rapidly on exposure to the environment owing to the presence of particular metal complexes. More particularly this invention relates to the controlled photogredation of vinyl polymers wherein the induction period, i.e. the duration between the exposure to sunlight (or the suitable radiation) and the beginning of said degradation is predetermined and may be very short.

It is known that films of vinyl or vinylidene polymers and copolymers, especially ethylene polymers are widely used for many purposes including wraps and packaging materials and anyway for wrapping up different kind of products.

Inevitably certain of such films are discarded in areas of public accommodation and become objectionable litter which can accumulate in substantial volume by reason of the fact that such films are not readily degraded by natural environmental factors.

Owing to the unusual stability and to the resulting accumulation of such plastic materials, increasing attention is being given to the problem of producing wrapping and packaging polymer films which will degrade after use and upon exposure to other environmental including sunlight. Moreover agriculture and particularly the field of crop protection has been requiring more and more plastic materials for developing and manufacturing mulching films which must perform their service, namely to cover, enclose or protect the soil and the growing crops, under fully exposed outdoor conditions for a certain period of time or better, from a specific time to another specific time of the year. Subsequently, certain agricultural operations, such as ploughing or gathering of the crop, must take place and the films constitute an obstacle to such operations and must be removed. Except for some cases in which the films can be reused and is worth recovering, removal is a time consuming and costly operation.

Therefore the use of degradable polymer films is a desirable way of solving the problem of removal of mulching films as well as the problem of destroying plastic materials casually disposed after use.

In the case of wrapping or packaging films the environmental pollution caused by their residues may be avoided by compulsory use of cellulose-based materials which degrade fairly rapidly when exposed outdoors to the action of atmospheric agents; this is not the case with mulching films whose life time will be as long as may be desired and however for a given period of time and which have been normally removed after use. Such a problem was partially solved with the discovery of resin compositions containing particular agents which favour their degradation by causing their prior embrittlement followed by rapid decay and formation of oxidized and biodegradable production. Thus British Patent Specification No. 1,356,107 describes vinyl polymer compositions containing a complex of a transition metal, preferably iron, which can be activated by light of wavelength of less than 330 nm, U.V. radiation. This complex can be formed "in situ" from so called complexing agent and a salt of the metal.

In the concentrations used the complex makes the composition stable in the manufacturing process in which it is brought to the molten state, usually extrusion or blow extrusion and during indoor use or in sufficiently sheltered places such as houses, shops, etc. On the contrary when the polymer material is disposed of or exposed to sunlight (outdoor environment), the metal complex splits with release of the metal in a photoactivated state which causes the rapid degradation of the polymer. A film of degradable polymer containing metal complexes such as those claimed in the above mentioned patent, will pass upon being exposed to U.V. radiation, through a plurality of degradation stages, including a stage which is called "embrittlement" in which the film maintains its forms and continuity and therefore its protective character, substantially unaltered, but in which it will easily be broken up by means of any mechanical action. The embrittlement stage is characterized by an elongation at break substantially equal to zero.

The lasting time between the exposure to U.V. radiation and the attainment of the embrittlement point constitutes the so called "induction period".

The induction period may widely vary according to different environmental conditions and/or the type of polymer composition but is rather unpredictable and cannot be controllably predetermined. This is the limit of the above mentioned invention.

The British patent specification No. 1,586,344 describes thermoplastic polymer compositions in which the time to embrittlement can be predetermined and varied as one wishes with considerable precision especially in polyolefin films, said compositions containing carefully controlled amount of a metal complex of the type described in the above mentioned British specification (GB No. 1,356,107)in combination with an ultraviolet light stabilizing complex, preferably a nickel complex.

The results which have been obtained by introducing the two types of complexes in the plastic compositions are very surprising since iron compounds alone and nickel compounds alone while both influencing the embrittlement time, do not permit, as above mentioned, to control and predict this latter with precision.

The single functions of the two types of complexes, namely the complexes of iron (or Mn or Ce) on one hand and the complexes of nickel (or Co or Cu, or Zn) on the other, are very different from one another. Iron complexes are powerful activators of U.V. degradation of a variety of polymers after a relatively short induction period whereas nickel-complexes are U.V. stabilizers.

When simultaneously present in a polymer composition they act with a sort of synergistic effect which is not merely an enhancement of a certain property (such as a more rapid photogredation or an extension of the induction period) but a qualitative and complete change of behaviour. As a matter of fact the induction period is more complete and the stabilization of the polymer compositions which is promoted by the Ni-complex is enhanced during this period by reason of the comtemporary presence of the iron complex.

The compositions containing such a combination of the two aforementioned complexes are particularly useful for the production of films, especially mulching films which are allowed to remain on the soil for a certain and desired period of time and afterwards will degrade and will not interfere with the subsequent soil working operations such as ploughing or harvesting but actually will in fact be eliminated by those operations without the need of any change in them.

This type of polymer composition is very useful in agriculture and in countries with a very sunny climate such as are found in the Middle-East, where it is relatively easy to obtain fast degradation rates and it is necessary to extend the induction period to meet the needs of a particular crop. On the other hand the induction period would be in many cases absent without the synergistic action of the nickel-complex. This was the purpose of British Patent No. 1,586,344. On the contrary in Northern Europe and similar northern latitudes, where there is less sunshine the problem is the opposite of that one previously discussed.

In northern countries the scanty amount of radiation is not sufficient to induce in a reasonable period of time the photoactivation and the degradation of polymer compositions either containing only one metal complex such as those mentioned in the B.P. No. 1,356,107 or containing a particular combination of two of them such as those mentioned in B.P. No. 1,568,344. The practical result of the insufficient U.V. radiation is the difficulty to achieve a fast rate of degradation while the physical disintegration of the plastic materials occurs over a longer time than it would be needed as it should be the case of the mulching films in agriculture.

This problem is exacerbated by the fact that in Europe and in other northerly climates with very limited sunshine, mulching films contain carbon black in order to control and prevent the growth of weeds (in countries with very sunny climates mulching films are employed in order to prevent soil parching) and this additive behaves as an U.V. stabilizer for plastics thus extending the embrittlement time even further (see G. Scott, Atmospheric Oxidation and Antioxidants, Elsevier, page 186 and 287).

It has been shown previously by one of the present inventors that certain oxygen-containing metal-complexes of iron and cobalt, such as the β-diketone complexes (I)

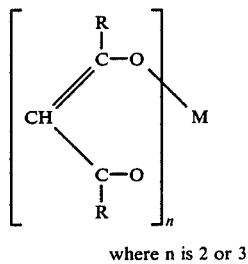

where n is 2 or 3 are very powerful activators for the photodegradation of polyethylene [M.W. Amin and G. Scott, Europ. Polymer J., 10, 1019, (1974)] but that they cannot be used as additives for polymers in commercial practice, because they are also powerful activators for thermal oxidation of polymers during thermal conversion and processing operations such as extrusion or blow extrusion. Polymer compositions based on polylefins and containing catalytic amounts of (I) when processed and extruded to films undergo severe and deleterious thermal degradation reactions which lead to technologically unacceptable changes in melt flow index and other technological properties.

We have surprisingly and quite unexpectedly found, according to the present invention, that the above mentioned thermal degradation reactions which take place in polymer compositions containing (I) can be completely inhibited by surprisingly small molar proportions of thermal stabilizing dithiolate complexes of a transition metal or of a metal of group II or IV of the periodic table of the elements, notably zinc, nickel and cobalt dialkyl-dithiocarbamates. The thermal stabilization attainable by metal complexes based on sulphur compounds and other metal complexes is well known and has been already shown in British Patent No. 1,586,344: some of those complexes (Ni, Cu, Co) are U.V. stabilizers (G.B. No. 1,356,107; 1,586,344).

On the contrary it is quite unexpected and unknown that very small amount of thermal stabilizers such as those of the present invention, when used in combination with complexes of type (I) and in molar ratios ranging from 1:4 to 1:5, actually increase the rate of photodegradation reactions, thus giving significantly shorter embrittlement times than those attained with the oxygen complexes alone.

A second effect observed by combining very small amounts of at least one of the aforesaid thermostabilising complexes with complexes of type (I) which are activators for the photodegradation of polymers, is the appearance of a very short but very well defined induction period upon exposure of degradable polymer compositions to sunlight.

That is to say that the induction period which in the case of complexes of the type (I) used alone is normally absent, in the case of the present invention is very short but the stability of the compositions is absolute and complete during the induction period. Afterwards the degradation phase is sharp and rapid with total decay of the thermoplastic material.

The above mentioned effects are however only observed when the molar ratio of the thermostabilising complex (for example Ni dithiocarbamate) to photoactiving complex (I) (for example iron acetylacetonate) is less than 0.5.

However, the most desirable ratios are lower than 0.3. When the molar ratio approaches 1 or is higher than 1, then the resulting observable effect is that of a noticable extension of induction period, with disappearance of the subsequent rapid and sharp decomposition.

This means that as the molar ratio of stabilising to activating complex increases above 0.5 the very powerful and rapid phase of polymer degradation which is observable in the presence of complexes of type (I) either alone or in combination with very small amounts of thermal stabilising complexes is steadily disappearing.

The practical consequences of this new discovery are that much shorter embrittlement times can be obtained than it has been possible to achieve previously in polyethylene coupled with excellent stability of the polymer during processing.

The most characteristic aspects of the present invention are illustrated by means of the figures in the enclosed drawings wherein a comparison is made between the particular combination of the two types of complexes when used in the desirable ratios and the same combination but at different ratios as well as the iron dithiocarbamate referred to in Brit. Pat. No. 1,356,107. The first figure refers to low density polyethylene (LDPE) films containing different amounts of iron dimethyldithiocarbamate (FeDMC), iron tris-acetylacetonate (FeAcAc) and zinc diethyldithiocarbamate (ZnDEC) and exposed in a weatherometer at the same time.

The abscissa (of FIG. 1 and 2) represents the exposure-time and the ordinate (of both figures) represents the variation of the carbonyl index (i.e. the ratio of the CO I.R. absorbance at a given time to the initial CO absorbance) as a measure of the polymer photodegradation. Two different photodegradation activation complexes namely a complex of type (I) (FeAcAc=0,0005 moles/100 g; curve A) and iron dimethyldithiocarbamate (FeDMC=0,0005 moles/100 g; curve B) contained at the same concentrations in LDPE behaves in a quite different way with respect to photodegradation control.

Iron acetylacetonate promotes the immediate start of the degradative process while the second acts as a normal photoactivator (G.B. No. 1,356,107).

When Iron acetylacetonate is combined with very small amounts of a thermal stabiliser (FeAcAc=0,0005 moles/100 g+Zn DEC=0,000125 moles/100 g;

$$R = \frac{Zn}{Fe} = 0.25;$$

curve C) the degradation rate is enhanced but the degradation process is preceded by a very short but very complete induction period during which the stability is absolute as already mentioned.

When Zn to Fe ratio is raised (R=1; FeAcAc=ZnDEC=0,0005 moles/100 g; curve D) the sharp trend or curve C turns into the steadily raising trend of curve D this noticeably extending the embrittlement time to values which are very similar to those observed in the case of FeDMC alone (curve B). However, the comparison between curve C and curve D is the better visual explanation of the novelty and originally inherent to the present invention. The latter aspect of this invention is illustrated in the second figure of the enclosed drawings, from which it can be seen that in an internal mixer the thermal stability of FeAcAc/ZnDEC (straight line C; FeAcAc=0,0005 moles/ 100 g+Zn DEC=0,000125 moles/100 g or FeDMC alone=0,0025 moles/100 g) is very much better than that of the control (curve B=no additive) and as good as that of FeDMC alone). FeAcAc alone on the contrary (curve A; FeAcAc=0,0025 moles/100 g causes very rapid oxidation of LDPE under these conditions.

This invention consequently relates to polymer composition which are very quickly degradable under the action of ultra-violet light and/or sunlight wherein the induction period, namely, the delay time between the exposure to U.V. radiation and the start of said degradation is predetermined and may be very small. The polymer compositions are characterized in that the photo-degradation is promoted by means of the additional presence of at least one metal complex which is a powerful activator of said photo-degradation of polymers in combination with a very small amount of dithiolate metal complex which is a stabiliser for thermal degradation. Molar ratios R of the activator complex to the thermal stabiliser are lower than 0.5 and preferably $R \leq 0.3$.

Moreover this invention relates to any protective or wrapping membrane and/or mulching film obtainable from said compositions by means of usual manufacturing processes such as extrusion or blow extrusion.

The thermoplastic vinyl polymer is preferably a film or fibre-forming polymer or copolymer such as polyethylene polypropylene, poly (4-methyl-1-pentene), or polystyrene or terpolymer which may contain unsaturation. Other vinyl polymers such as polyvinylacetate, polyvinylchloride, polymethyl methacrylate, and polycrylonitrile and copolymers of the corresponding monomers, including vinylchloride-vinyl acetate copolymers, including graft copolymers with unsaturated polymers, as well as mixtures of such polymers, particularly with unsaturated polymers, can also be used in the compositions of the present invention. This process can also be used for condensation polymers such as polyesters, polyamides and polyurethanes.

The thermoplastic compositions of this invention may contain other compounding ingredients, such as blowing agents, various types of antioxidants, stabilisers, lubrificants, antistatic agents and antiblocking agents. Antioxidants do not take part in the embrittlement process and therefore may be used in-conventional amounts.

Inert pigments, dyes, other conventional Additives and carbon black may also be added to the polymer compositions.

In general pigments act as U.V. screening agents and increase the embrittlement time of the polymer and this is particularly true for carbon black as above already mentioned.

The photo-activating complex can be any organosoluble transition metal complex in which the ligand is attached to the metal through oxygen. Preferred complexing agents are $\beta$-di-ketones, $\beta$-ketoesters and among them acetylacetone.

Preferred transition metals are iron, cobalt and manganese. The thermal stabilising complex is preferably a group II, group IV or a transition metal complex in which the complexing agent is any sulphur containing compound among the complexing agents disclosed in the earlier patents. In particular dialkyl dithiocarbamates, dialkyldithiophosphates, alkylxanthates mercaptobenzothiazoles and nitrogen coordinating compounds such as the salicylideneimides etc.

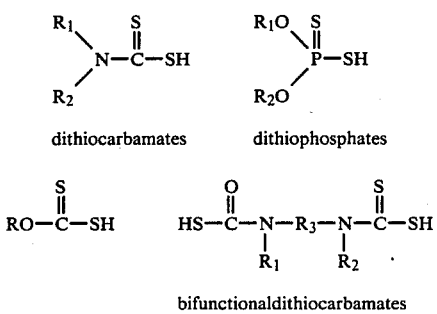

-continued

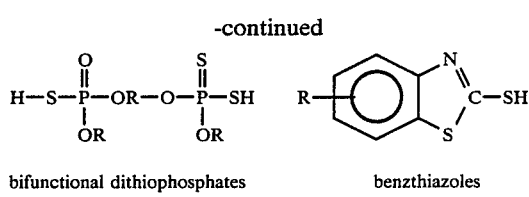

bifunctional dithiophosphates      benzthiazoles

Where R, $R_1$, $R_2$, $R_3$ each represent hydrogen or an alkyl, aralkyl or amyl group, which may be unsubstituted or substituted as well as linked together to form heterocyclic rings.

Dithiocarbamates and the above mentioned derivatives thereof are the preferred complexing agents since they are substantially non toxic.

The preferred combinations of metal complexes in the thermoplastic polymer compositions according to the present invention are iron-acetylacetonate and Ni or Zn dialkyldithiocarbamates. The concentration of the oxygen complexes is generally from 0,0005 to 0,5% by weight and preferably from 0,0005 to 0,2% by weight.

The concentration of the thermal stabilising sulphur containing metal complex depends on the desired relative molar ratio R of stabilising to activating complex. The molar ratio R is generally lower than 0,5 preferably $R \leq 0.3$. However, the relative concentrations to be used of the two metal complexes depend largely on the intended use of the finished article. The following examples further illustrate the present invention. The starting material of the polymer compositions was a low density polyethylene LDPE with a melt flow index MFI=2.16 Kg (10' at 190° C.).

EXAMPLE I

Iron acetylacetonate was added in an internal mixer (FeAcAc=$5 \cdot 10^{-4}$ mol/100 g) to the aforesaid LDPE and a film was obtained using the blow extrusion technique which is conventional in processing polyethylene. Maximum processing temperatures were in the order 210° C. The film thickness was 30 microns; however test carried out with greater thicknesses, up to the practical maximum of 100 microns, showed that the behaviour of the material was substantially the same for all thicknesses in the said range.

The films were then exposed in a Weatherometer to U.V. irradiation. Table I summarise the results obtained from films made using the same methodology but adding different complexes to the LDPE.

TABLE I

Behaviour of films of LDPE containing FeAcAc—FeDMC complexes alone or in combination with ZnDEC or NiDEC and laid out.

| Type of complexes (mol/100 g) | Embrittlement time (hours) |
|---|---|
| FeAcAc ($5 \cdot 10^{-4}$) | 425 |
| FeAcAc ($5 \cdot 10^{-4}$) + ZnDEC ($1.25 \cdot 10^{-4}$) | 375 |
| FeDMC ($5 \cdot 10^{-4}$) | 1300 |
| FeDMC ($1.25 \cdot 10^{-4}$) | 900 |
| FeDMC ($5 \cdot 10^{-4}$) + ZnDEC ($5 \cdot 10^{-4}$) | 1200 |
| FeDMC ($2.5 \cdot 10^{-4}$) + NiDEC ($0.25 \cdot 10^{-4}$) | 750 |
| reference (LDPE without additives) | 2200 |

EXAMPLE II

Polypropylene samples containing NiDEC ($2.5 \cdot 10^{-4}$ mol/100 g) amounts of FeAcAc variable and ranging from 0 to $15 \cdot 10^{-4}$ mol/100 g, were processed in an internal mixer at 180° C. After 10 minutes processing the melt flow index was measured and the results are reported in table II.

This table shows that even the combination containing a six-fold excess of FeAcAc is as thermally stable as that containing NiDEC alone in Polypropylene which is notoriously subject to oxidative degradation during processing.

TABLE II

Thermal stability of polypropylene containing NiDEC ($2.5 \cdot 10^{-4}$ mol/100 g) and FeAcAc (variable amounts) and processed in an internal mixer at 180° C. and 10 min.

| FeAcAc (Mol/100 g) | (MFI) 10 min |
|---|---|
| 0 | 0.64 |
| $7.5 \cdot 10^{-4}$ | 0.66 |
| $10.0 \cdot 10^{-4}$ | 0.64 |
| $15.0 \cdot 10^{-4}$ | 0.65 |

What we claim is:

1. Polymer compositions comprising a vinyl polymer and a combination of at least two metal complexes wherein the complexing agent of the first complex is attached to the metal through oxygen and the metal is a transition metal, and the complexing agent of the second complex is attached to the metal through sulphur and the metal is a transition metal or a metal of group II or IV of the periodic table of the elements, wherein the first metal complex is an activator for photodegradation and for thermal oxidation of the vinyl polymer and the second metal complex is a thermal stabilizer of the polymer, and wherein the molar ratio of the second complex to the first metal complex is 0.5 or less.

2. Polymer compositions according to claim 1 in which the first complex is an iron complex or a cobalt complex.

3. Polymer compositions according to claim 1 in which the second complex is a zinc or nickel or cobalt complex.

4. Polymer compositions according to claim 1 in which the complexing agent of the first complex is acetylacetone.

5. Polymer compositions according to claim 1 in which the complexing agent of the second complex is selected from the group consisting of dialkyldithiocarbamates, dialkyldithiophosphates, alkylxanthates and mercaptobenzothiazoles.

6. Polymer compositions according to claim 1 which contain 0,0001 to 0.5% by weight of the first complex.

7. Polymer compositions according to claim 1 which contain 0,00005 to 0.25% by weight of the second complex.

8. Polymer compositions according to claim 1 which include an antioxidant.

9. Polymer compositions according to claim 1 which include carbon black.

10. A film obtained from a composition as claimed in claim 1.

11. A film according to claim 10 which is a protective or mulching film.

12. A film according to claim 10 which is 30 to 100 microns thick.

* * * * *

UNITED STATES PATENT AND TRADEMARK OFFICE
CERTIFICATE OF CORRECTION

PATENT NO. : 4,939,194

DATED : July 3, 1990

INVENTOR(S) : Gerald Scott et al.

It is certified that error appears in the above-identified patent and that said Letters Patent is hereby corrected as shown below:

In column 5, line 40, "this" should be --thus--;

In column 6, in the formula for bifunctional dithiocarbamates in the bottom right hand corner, $$\text{"HS-}\underset{R_1}{\overset{\overset{O}{\|}}{C}}\text{-N-}R_3\text{-N-}\underset{R_2}{\overset{\overset{S}{\|}}{C}}\text{-SH"} \quad \text{should be} \quad \text{--HS-}\underset{R_1}{\overset{\overset{S}{\|}}{C}}\text{-N-}R_3\text{-N-}\underset{R_2}{\overset{\overset{S}{\|}}{C}}\text{-SH--};$$

In column 7, in the formula for bifunctional dithiophosphates in the top left hand corner, $$\text{"H-S-}\underset{OR}{\overset{\overset{O}{\|}}{P}}\text{-OR-O-}\underset{OR}{\overset{\overset{S}{\|}}{P}}\text{-SH"} \quad \text{should be} \quad \text{--H-S-}\underset{OR}{\overset{\overset{S}{\|}}{P}}\text{-OR-O-}\underset{OR}{\overset{\overset{S}{\|}}{P}}\text{-SH--}.$$

Signed and Sealed this

Eighth Day of October, 1991

Attest:

HARRY F. MANBECK, JR.

*Attesting Officer*     *Commissioner of Patents and Trademarks*